2,819,274
Patented Jan. 7, 1958

2,819,274

MONOHYDROXY-β-ACYLAMINOANTHRA-
QUINONES

Paul Grossmann, Binningen, Switzerland, assignor to Ciba Limited, Basel, Switzerland, a Swiss firm No Drawing. Application March 19, 1956
Serial No. 572,226

Claims priority, application Switzerland April 1, 1955

3 Claims. (Cl. 260—377)

This invention provides as valuable new dyestuffs mono-hydroxy-β-acylaminoanthraquinones which contain a grouping of the general formula

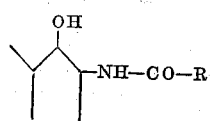

in which R—CO— represents the radical of a mono-carboxylic acid containing at least three carbon atoms.

The invention also provides a process for the manufacture of these new dyestuffs, wherein a 1-hydroxy-2-amino-anthraquinone, which contains the atomic grouping

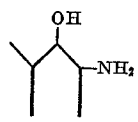

is acylated with a reactive derivative of a mono-carboxylic acid containing at least three carbon atoms.

As a starting material for use in this process there is used more especially 1-hydroxy-2-aminoanthraquinone itself.

As acylating agents there are used reactive functional derivatives of mono-carboxylic acids, especially those containing 3–12 carbon atoms. There are used more especially aliphatic carboxylic acids such, for example, as propionic acid, butyric acid, isobutyric acid, caproic acid, caprylic acid and lauric acid. However, good results are also obtained with reactive functional derivatives of cyclic carboxylic acids, such as benzoic acid, p-toluic acid or hexahydrobenzoic acid.

As reactive functional derivatives there come into consideration more especially the halides, advantageously the chlorides, of the acids. The acid anhydrides can also be used for the acylation.

The acylation can be carried out by methods in themselves known, for example, in an inert organic solvent, such as nitrobenzene or chlorobenzene, advantageously with the addition of an acid-binding agent, for example, a tertiary base, such as pyridine or dimethyl-aniline, and is advantageously carried out at a raised temperature.

The dyestuffs of this invention which contain the grouping of the above Formula 1 and an acyl residue of low molecular weight are very suitable, especially after being suitably pasted, and, if desired, reprecipitated, for example, from sulfuric acid, for dyeing or printing shaped structures and especially fibres of polyesters which consist for example, of alternate glycol and terephthalic acid residues and are known in commerce under the names "Terylene" or "Dacron." Pure yellow dyeings, which are distinguished by their very good fastness to light, are produced with the dyestuffs of this invention by the usual dyeing methods, for example, from a dye liquor, which contains a dispersion of the dyestuff and advantageously a dispersing agent, at a temperature in the vicinity of 100° C., advantageously with the addition of a swelling agent, or at a temperature above 100° C. under superatmospheric pressure.

The known 1-hydroxy-2-acetylamino-anthraquinone can also be used in the presence of a swelling agent for dyeing "Terylene"; according to the ordinary high temperature process, however, which consists in heating at a temperature above 100° C. the material to be dyed with an aqueous dispersion of the dyestuff in the presence of a wetting agent in a pressure vessel, no useful dyeings can be obtained. The dyestuffs obtained according to the invention which are suitable for the dyeing of Terylene according to both methods represent therefore a surprising step forward in the art as compared with the known 1-hydroxy-2-acetyl-amino anthraquinone.

The new dyestuffs can also be used for dyeing or printing shaped structures of cellulose esters or ethers, superpolyamides or superpolyurethanes, and they can also be used as pigments.

For some purposes, above all for dyeing "Dacron" or "Terylene" fibres, it is especially advantageous to use mixtures of different hydroxy-acylaminoanthraquinones of this invention. These mixtures can be obtained either by mixing together the finished unitary products or by carrying out the process of this invention with mixtures of different starting materials of the kind referred to above. For example, a mixture of different 1-hydroxy-2-aminoanthraquinones may be acylated together, or a mixture of different acylating agents may be used, for example, a mixture of propionic acid chloride and butyric acid chloride. Mixtures of 1-hydroxy-2-acylamino-anthraquinones with isomeric hydroxy-acylaminoanthraquinones, especially 1-hydroxy-4-acylaminoanthraquinones, also give excellent results.

The following examples illustrate the invention, the parts and percentages being by weight:

*Example 1*

12 parts of 1-hydroxy-2-aminoanthraquinone are heated in 36 parts of chlorobenzene with 6.6 parts of dimethyl-aniline and 6 parts of butyryl chloride until the color of the mixture ceases to change towards yellow. After cooling the reaction mixture, the dyestuff is precipitated with 36 parts of methanol, filtered off and washed with methanol. It dyes polyester fibres of the type of "Dacron" yellow tints having an excellent fastness to light and a good fastness to sublimation.

By using, instead of butyryl chloride, an equivalent quantity of propionyl chloride, capronyl chloride, lauryl chloride, benzoyl chloride or hexahydrobenzyl chloride, dyestuffs having similar properties are obtained.

*Example 2*

1.2 parts of the dyestuff obtained as described in Example 1 are dissolved in 30 parts of sulfuric acid of 90 percent strength at 0° C. and the solution is poured on to ice and water and filtered. The filter cake so obtained is ground with 1 part of dry sulfate cellulose waste liquor in a roller mill.

100 parts of fibrous material of a polyester of the type of "Terylene" are first cleaned in a bath which contains in 1000 parts of water 1–2 parts of the sodium salt of N-benzyl-μ-heptadecyl-benzimidazole-disulfonic acid and 1 part of a concentrated aqueous solution of ammonia for ½ hour. The material is then entered into a dyebath in which the dyestuff paste obtained as described in the preceding paragraph has been dispersed with the addition of 4 parts of the sodium salt of N-benzyl-μ-heptadecyl-benzimidazole disulfonic acid. The whole is heated in a pressure vessel to 120° C. and maintained for about ½ hour at that temperature. The material is then rinsed and, if necessary, washed for ½ hour at 60–80° C. with a solution containing in 1000 parts of water 1 part of the sodium salt of N-benzyl-μ-heptadecyl-benzimidazole-disulfonic acid. There is obtained a strong yellow dyeing.

*Example 3*

100 parts of fibrous material of "Terylene" are first cleaned for ½ hour in a bath which contains in 1000 parts of water 1–2 parts of the sodium salt of N-benzyl-μ-heptadecyl-benzimidazole disulfonic acid and 1 part of a concentrated aqueous solution of ammonia. The material is then pre-swelled for ½ hour at 80° C. in a dyebath which contains in 3000 parts of water 15 parts of a mixture of approximately equal parts of ortho-hydroxydiphenyl, pine oil and Turkey red oil and 15 parts of acetic acid. The bath is then cooled to 50° C. and the dyestuff paste obtained as described in the first paragraph of Example 2 is added. The bath is raised to the boil in the course of ½ to ¾ hour and dyeing is carried on for 1–1½ hours at a temperature as near as possible to the boiling temperature. The material is then rinsed well and if desired, washed for ½ hour at 60–80° C. with a solution which contains in 1000 parts of water 1 part of the sodium salt of N-benzyl-μ-heptadecylbenzimidazole disulfonic acid. There is obtained a strong yellow dyeing.

What is claimed is:

1. The compound of the formula

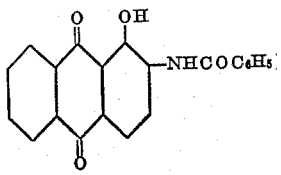

2. The compound of the formula

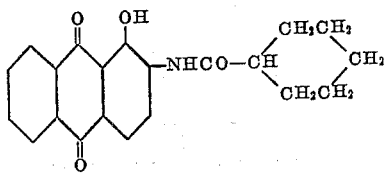

3. A compound of the formula

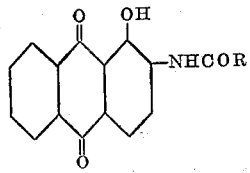

in which R represents a member selected from the group consisting of the benzene and hexahydrobenzene radicals.

References Cited in the file of this patent

UNITED STATES PATENTS

| | | |
|---|---|---|
| 2,522,034 | Grossmann et al. | Sept. 12, 1950 |
| 2,691,027 | Grossmann et al. | Oct. 5, 1954 |

OTHER REFERENCES

Society of Dyers and Colourists, Colour Index 1st Ed., January 1924, page 270, dye number 1128.

Beilstein's Handbook of Organic Chemistry, Berlin 1931, vol. 14, page 267.